United States Patent [19]

Tsai

[11] Patent Number: 5,623,964
[45] Date of Patent: Apr. 29, 1997

[54] SAFETY GAS FILLING VALVE FOR VEHICLES

[76] Inventor: Shun-Ching Tsai, P.O. Box 82-144, Taipei, Taiwan

[21] Appl. No.: 514,908

[22] Filed: Aug. 14, 1995

[51] Int. Cl.$^6$ ............................................. F16K 24/00
[52] U.S. Cl. ..................... 137/588; 137/587; 137/614.2
[58] Field of Search ............................. 137/587, 588, 137/614.2

[56] References Cited

U.S. PATENT DOCUMENTS

| | | | |
|---|---|---|---|
| 1,096,117 | 5/1914 | Melisch | 137/588 |
| 3,078,883 | 2/1963 | Beall, Jr. | 137/588 |
| 3,537,622 | 11/1970 | Venus, Jr. | 137/588 |
| 4,932,444 | 6/1990 | Micek | 137/588 |
| 5,186,224 | 2/1993 | Schirmacher | 137/588 |

FOREIGN PATENT DOCUMENTS 1132569  7/1962  Germany ................. 137/588

Primary Examiner—A. Michael Chambers
Attorney, Agent, or Firm—Alfred Lei

[57] ABSTRACT

A gas filling valve including an inner connector having a first threaded portion at a lower end and a second threaded portion at an intermediate portion which is larger than the first threaded portion in diameter, a relief valve having a tubular casing having a smaller opening at a lower end thereby forming a shoulder at an inner wall thereof, a spring disposed on the shoulder, a washer arranged on the spring, and a rubber ring mounted on the washer, a check valve arranged within the tubular casing of the relief valve, an inner tubular member having an upper end engaged with a lower end of the check valve, an outer tubular member having an upper end engaged with a lower end of the tubular casing of the relief valve, and an outer connector having a flange formed with a plurality of holes and external threads adapted to engage with a lower end of the outer tubular member, whereby the gas will be discharged immediately out of the vehicle in case of over-pressure thereby ensuring the safety of the driver.

3 Claims, 5 Drawing Sheets

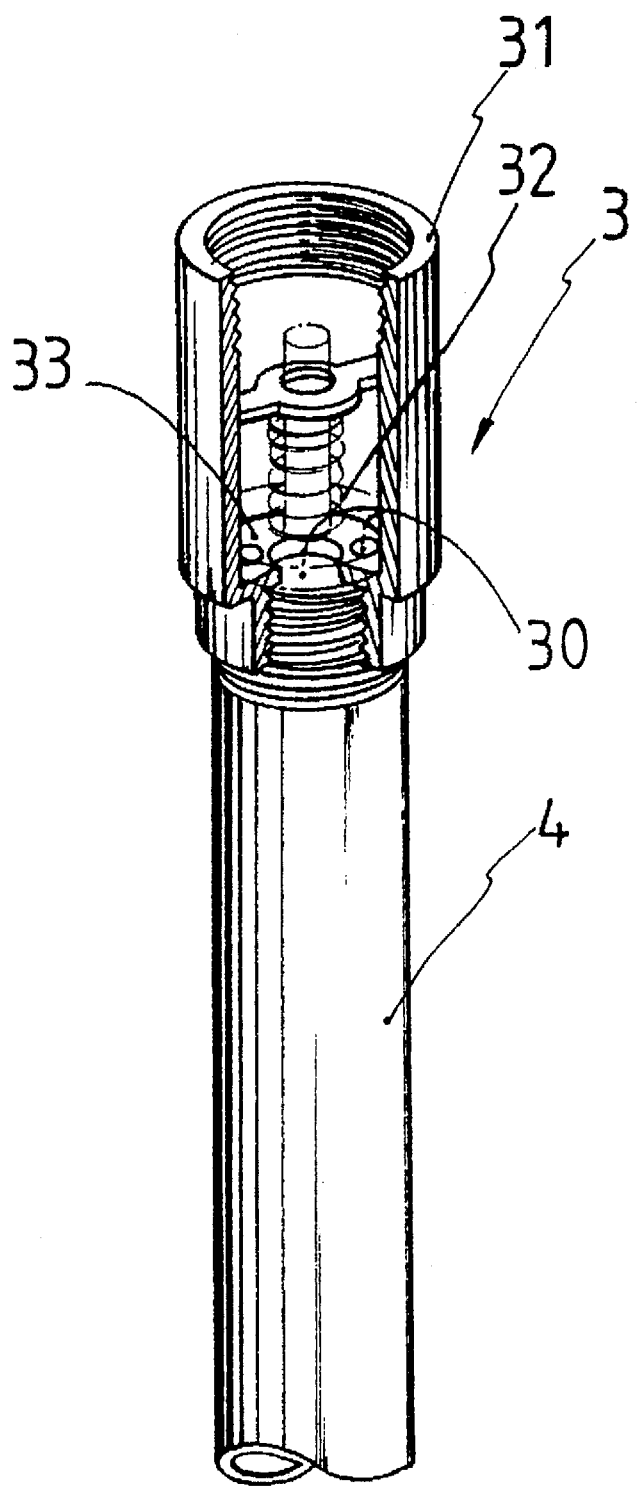
F I G. 4

SAFETY GAS FILLING VALVE FOR VEHICLES

BACKGROUND OF THE INVENTION

1. Field of the Invention

This invention relates to a safety gas filling valve for vehicles.

2. Description of the Prior Art

FIG. 1 shows a prior art gas filling valve for vehicles. As illustrated, the gas filling valve includes an inlet connector A11, a fixing plate A2, a tubular member A1, a check valve A4, a relief valve A3, and a pipe A12. However, as the relief valve A3 is located inside the vehicle, the driver will be rendered in a dangerous condition when the relief valve releases over-pressure gas or in case there is a gas leakage.

Therefore, it is an object of the present invention to provide a gas filling valve which can obviate and mitigate the above-mentioned drawbacks.

SUMMARY OF THE INVENTION

This invention relates to an improved gas filling valve for vehicles.

It is the primary object of the present invention to provide a gas filling valve which will discharge the gas immediately out of the vehicle in case of over-pressure.

It is still another object of the present invention to provide a gas filling valve which can ensure the safety of the driver.

It is still another object of the present invention to provide a gas filling valve which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
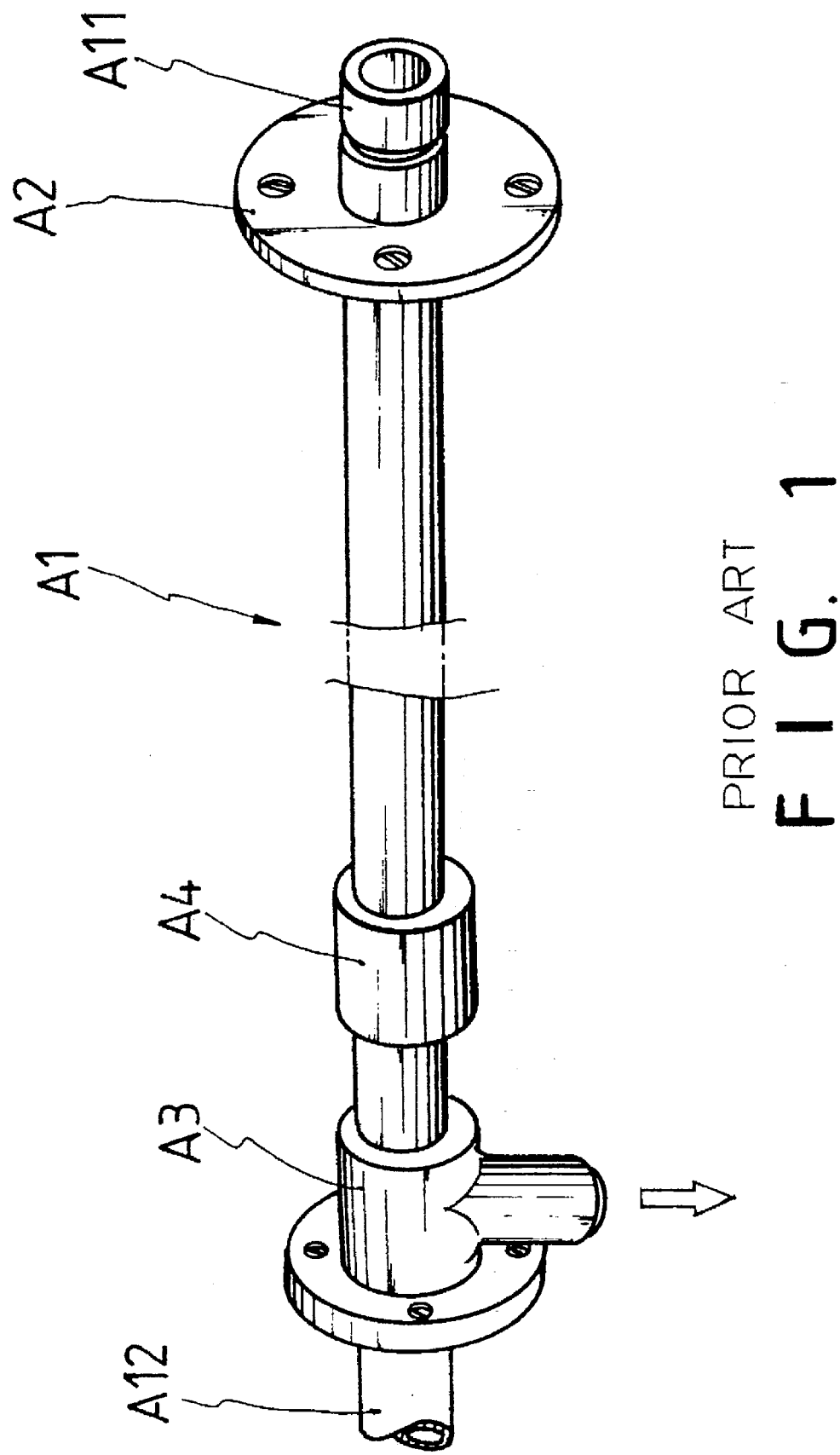

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
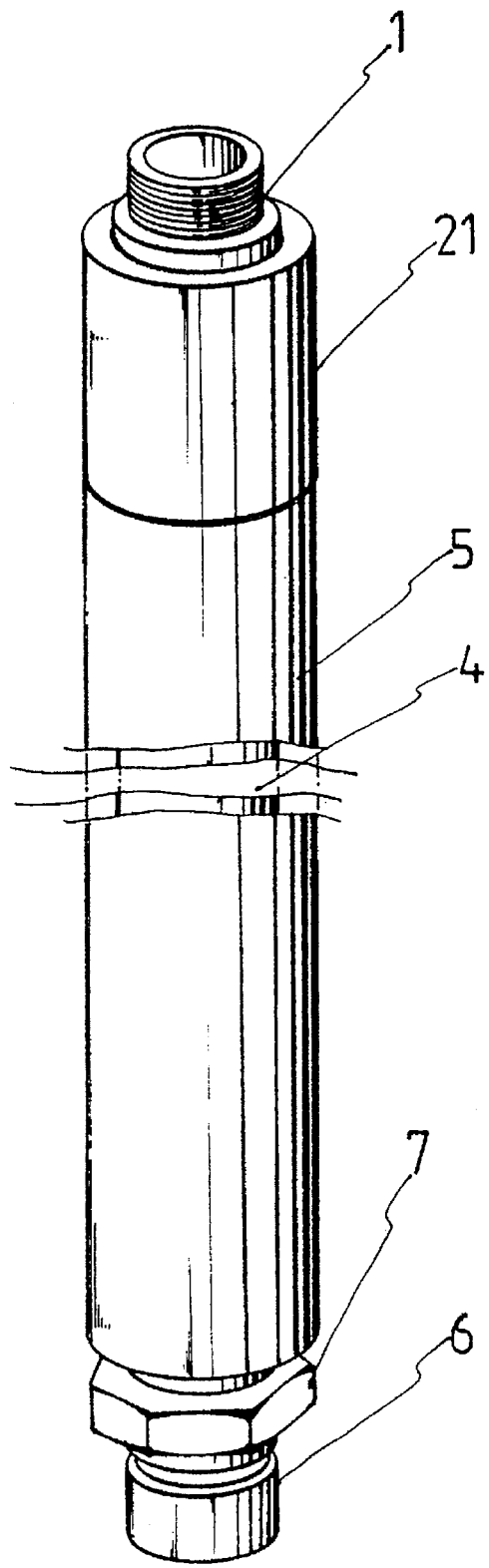
Figure 3:
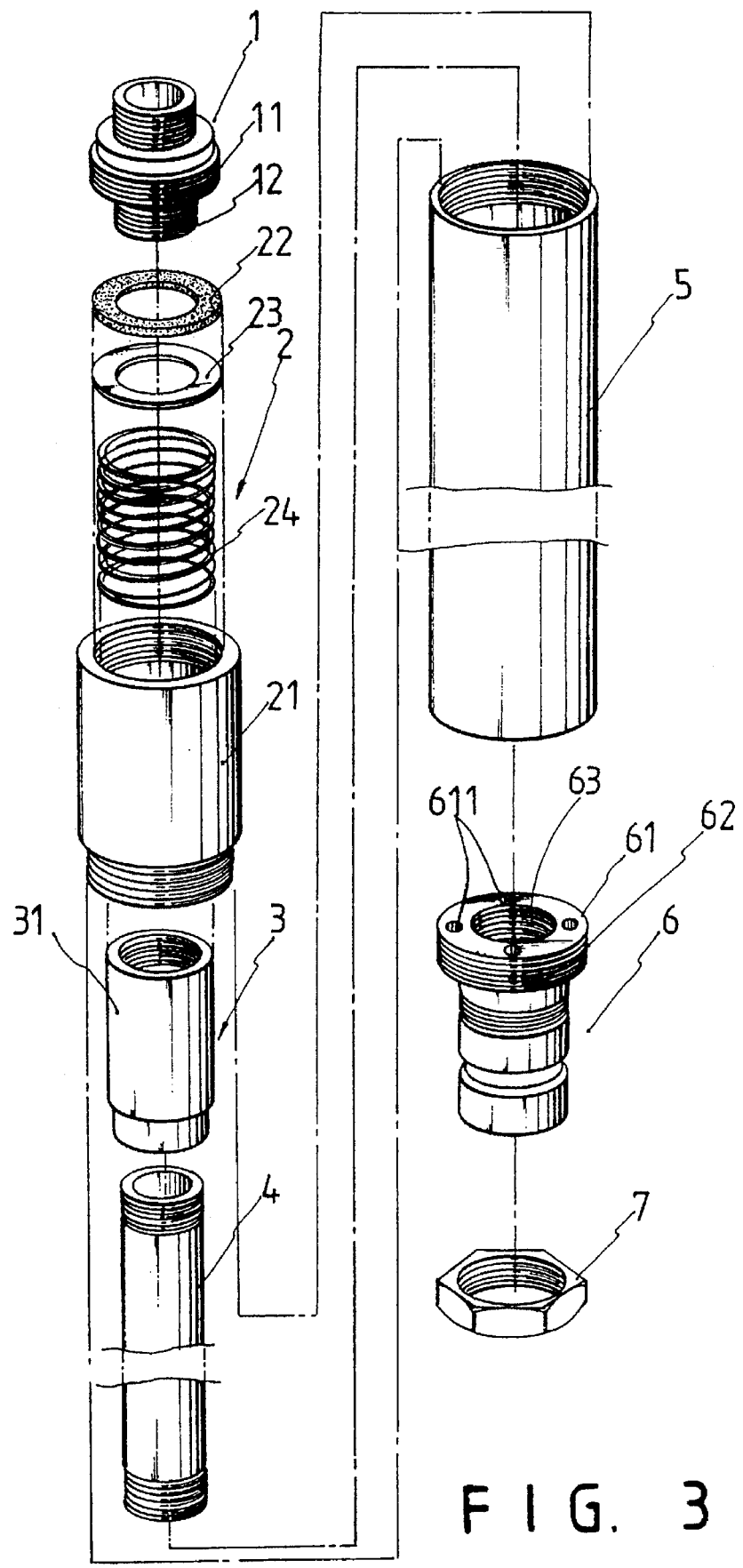
Figure 5:
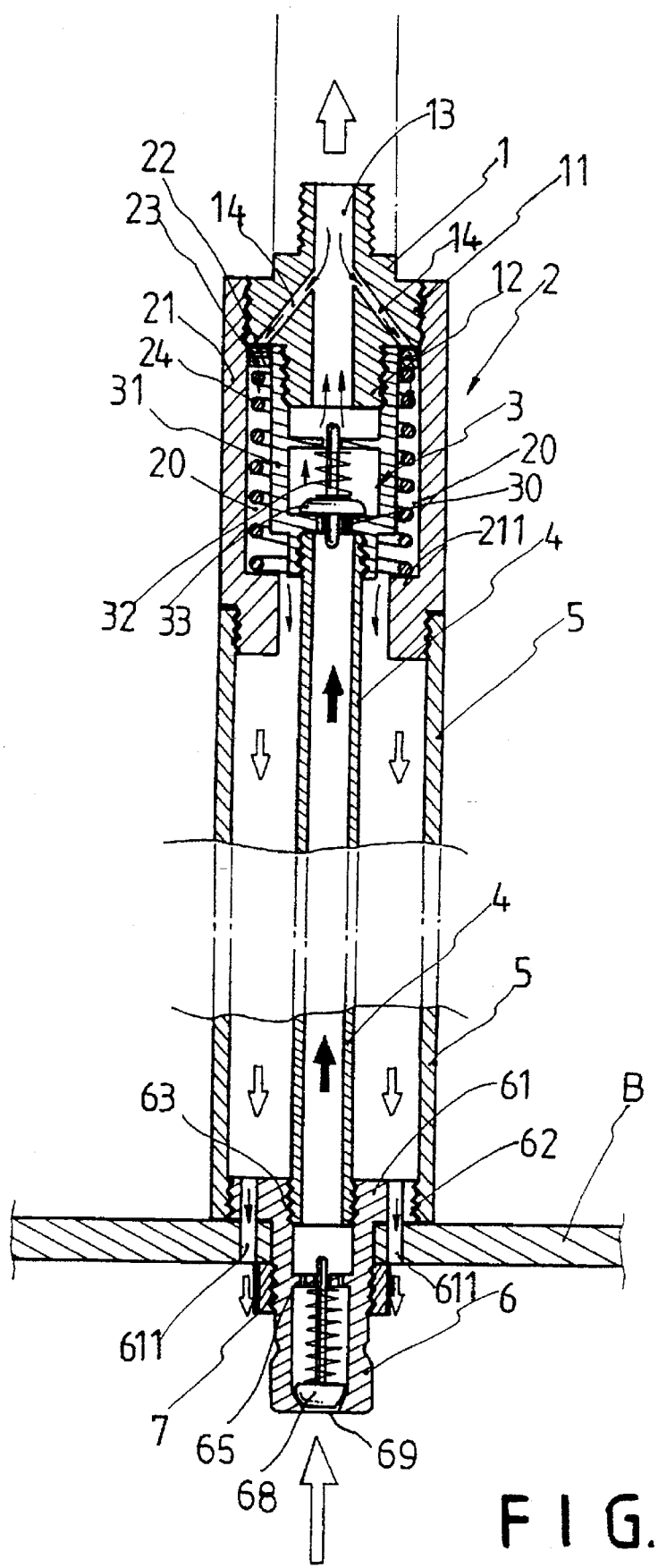

With reference to the drawings and in particular to FIGS. 2, 3, 4 and 5, the gas filling valve according to the present invention mainly comprises an inner connector 1, a relief valve 2, a check valve 3, an inner tubular member 4, an outer tubular member 5, an outer connector 6, and a locking nut 7.

The inner connector 1 has a first threaded portion 12 at the lower end and a second threaded portion 11 at the intermediate portion which is larger than the first threaded portion 12 in diameter. Further, the inner connector 1 is formed with a longitudinal through hole 13 and two branch passages which extends slopingly and downwardly through the inner wall of the hole 13 to the lower side of the second portion 11.

The relief valve 2 includes a tubular casing 21 having a smaller opening at the lower end thereby forming a shoulder 211 at the inner wall. A spring 24 is disposed on the shoulder 211 within the tubular casing 21. A washer 23 is arranged on the spring 24. A rubber ring 22 is mounted on the washer 23. The tubular casing 21 is provided with internal threads at the upper end and external threads at the lower end. The second threaded portion 11 of the inner connector 1 is engaged with the upper end of the tubular casing 21.

The check valve 3 includes a tubular housing 31, a spring 32, and a valve element 33. The tubular housing 31 is formed with a bridge portion across the inner wall thereof and an orifice 30 at the lower end thereof. The spring 32 is fitted over the upper portion of the valve element 33 thereby urging the valve element 33 to close the orifice 30. The check valve 3 is provided with internal threads at the upper end and external threads at the lower end. The upper end of the check valve 3 is engaged with the first threaded portion 12 of the inner connector 1.

The inner tubular member 4 is provided external threads at both ends and its upper end is engaged with the lower end of check valve 3.

The outer tubular member 5 is provided with internal threads at both ends and its upper end is engaged with the lower end of the tubular casing 21.

The outer connector 6 has a flange 61 formed with a plurality of holes 611 and external threads 62 engageable with the lower end of the outer tubular member 5. Further, the outer connector 6 is formed with a longitudinal passage 63 having a bridge portion 65 across the inner wall thereof. A spring-loaded valve 68 is fitted between the bridge portion 65 and an inlet 69 of the longitudinal passage 63. The nut 7 is used to lock the present invention on the housing B of a vehicle.

In case of over-pressure, the gas will flow out of present invention through the hole 13 and the branch passages 14 of the inner connector 1, the relief valve 2, the passage between the outer tubular member 5 and the inner tubular member 4, and the holes 611 of the outer connector 6 thereby ensuring the safety of the driver and the passengers (if any).

The invention is naturally not limited in any sense to the particular features specified in the forgoing or to the details of the particular embodiment which has been chosen in order to illustrate the invention.

Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A gas filling valve comprising:

an inner connector having a first threaded portion at a lower end and a second threaded portion at an intermediate portion which is larger than said first threaded portion in diameter, said inner connector being formed with a longitudinal through hole and two branch passages extending slopingly and downwardly through an inner wall of said hole to a lower side of said second portion;

a relief valve having a tubular casing having a smaller opening at a lower end thereby forming a shoulder at an inner wall thereof, a spring disposed on said shoulder, a washer arranged on said spring, and a rubber ring mounted on said washer, said tubular casing having an upper end threadedly engaged with said first threaded portion of said inner connector;

a check valve arranged within said tubular casing of said relief valve, said check valve including a tubular housing in which is fitted a spring-loaded valve element;

an inner tubular member having an upper end engaged with a lower end of said check valve;

an outer tubular member having an upper end engaged with a lower end of said tubular casing of said relief valve; and an outer connector having a flange formed with a plurality of holes and external threads adapted to engage with a lower end of said outer tubular member, said outer connector having a longitudinal passage in which is fitted a spring-loaded valve element engageable with an orifice of said outer connector.

2. The gas filling valve for vehicles as claimed in claim 1, wherein said tubular housing is formed with a bridge portion across an inner wall thereof and an orifice 30 at a lower end thereof, said spring-loaded valve element being fitted between said bridge portion and said orifice.

3. The gas filling device for vehicles as claimed in claim 1, further comprising a nut for locking said outer connector in a vehicle.

* * * * *